United States Patent

Tanimura et al.

[11] Patent Number: 6,065,701
[45] Date of Patent: May 23, 2000

[54] CASSETTE LABEL FOR CASSETTE TAPE INCORPORATING INTEGRATED CIRCUIT AND ANTENNA

[75] Inventors: Kazunari Tanimura; Takashi Sasaya; Ryoichi Shimizu; Hiromi Hoshino; Toru Suzuki, all of Kanagawa, Japan

[73] Assignee: Sony Corporation, Tokyo, Japan

[21] Appl. No.: 08/967,705

[22] Filed: Nov. 10, 1997

[30] Foreign Application Priority Data

Nov. 12, 1996 [JP] Japan ................................. 8-300449

[51] Int. Cl.7 ............................. G03B 23/02; G11B 23/02
[52] U.S. Cl. ........................... 242/344; 360/132; 360/134; 360/137
[58] Field of Search ............................ 242/344; 360/132, 360/137, 134

[56] References Cited

U.S. PATENT DOCUMENTS

| | | | |
|---|---|---|---|
| 4,769,731 | 9/1988 | Schoettle et al. | 360/132 |
| 4,841,386 | 6/1989 | Schiering | 360/132 X |
| 5,721,655 | 2/1998 | Thweatt | 360/137 |
| 5,764,457 | 6/1998 | Uhde et al. | 360/132 |
| 5,822,145 | 10/1998 | Nishida et al. | 360/132 X |

FOREIGN PATENT DOCUMENTS

| | | |
|---|---|---|
| 0 622 794 | 11/1994 | European Pat. Off. . |
| 41 10 683 | 10/1992 | Germany . |
| 42 18 188 | 12/1993 | Germany . |
| 196 28 504 | 1/1997 | Germany . |
| 9100176 | 3/1992 | Netherlands . |
| 2 303 523 | 2/1997 | United Kingdom . |
| WO 89/10615 | 11/1989 | WIPO . |
| WO 93/00680 | 1/1993 | WIPO . |
| WO 93/10536 | 5/1993 | WIPO . |
| 93/14501 | 7/1993 | WIPO . |
| WO 93/14501 | 7/1993 | WIPO . |
| WO 93/18493 | 9/1993 | WIPO . |
| WO 94/02912 | 2/1994 | WIPO . |

OTHER PUBLICATIONS

Patent Abstracts of Japan, vol. 096, No. 010, Oct. 31, 1996 of JP 08 161790 A (Hitachi Ltd), Jun. 21, 1996.

*Primary Examiner*—Donald P. Walsh
*Assistant Examiner*—William A. Rivera
*Attorney, Agent, or Firm*—Frommer & Lawrence & Haug, LLP.; William S. Frommer

[57] ABSTRACT

A cassette label comprising, an integrated circuit comprising a memory unit and a signal processing unit, an antenna members for carrying out at least a transfer of signals with respect to the integrated circuit, and a label body accommodating the integrated circuit and the antenna members and mounted on a back surface of a video cassette tape, and a video cassette tape comprising, a video tape for recording video signals, a cassette case for accommodating the video tape, and the cassette label mounted on the back surface of the cassette case.

12 Claims, 3 Drawing Sheets

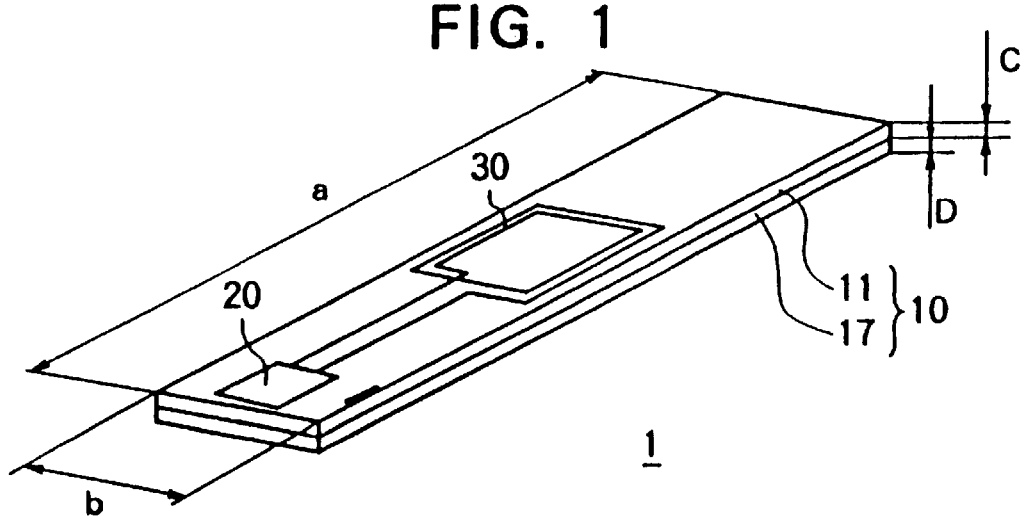
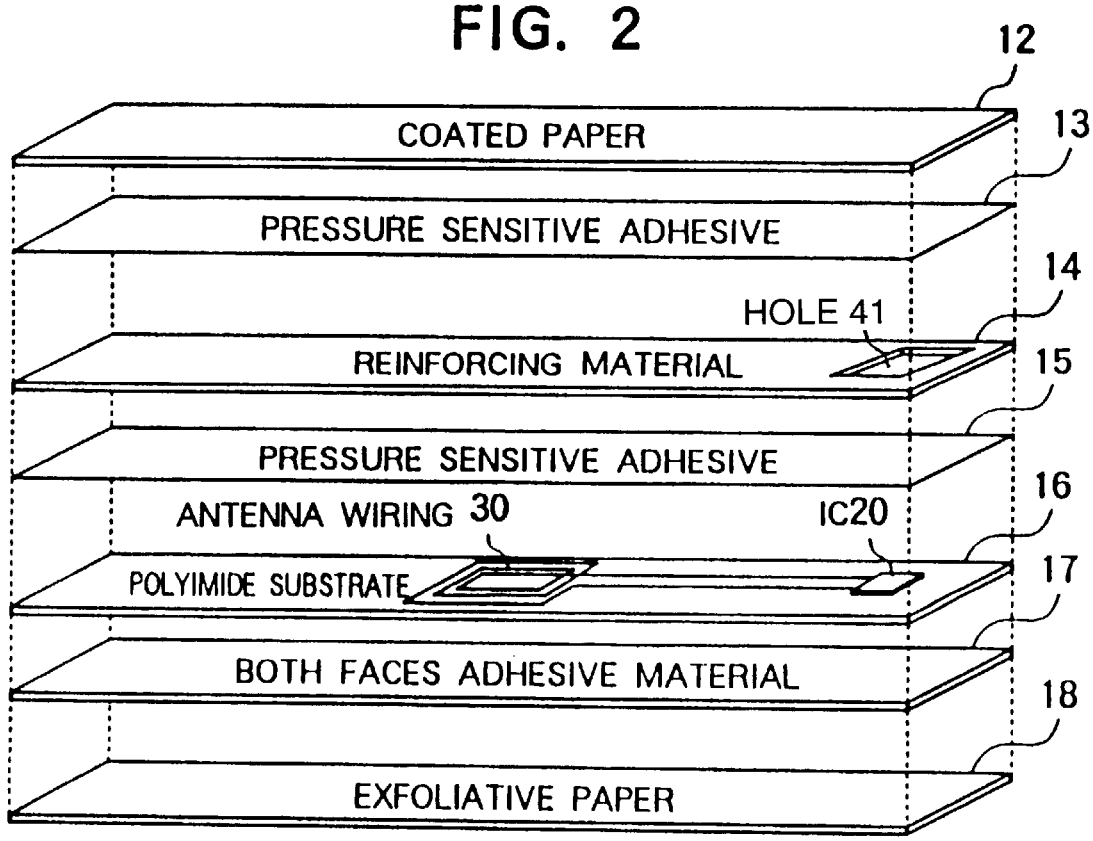

TO CPU OF VTR

CASSETTE LABEL FOR CASSETTE TAPE INCORPORATING INTEGRATED CIRCUIT AND ANTENNA

BACKGROUND OF THE INVENTION

1. Field of the Invention

The present invention relates to a cassette label used attached to a video tape cassette and capable of recording information concerning the recorded video data etc. and to a video tape cassette to which the cassette label is attached.

2. Description of the Related Art

There is a desire to record or store video data filmed by a television camera or other camera apparatus and recorded on a video tape in a state where information such as recording date and time, recording place, title, recording person, etc. can be easily confirmed.

Particularly, in a case when used for news gathering operations in a television broadcasting station, it is necessary to select and edit the required cuts from among a large number of cuts (continuously shot video or video data thereof) taken by a video camcoder etc. at a high speed.

Up until now, the usual practice has been to use the technique of separately making memos of a variety of recording information of the recorded video data on paper or the like at the time of shooting and selecting the desired video data at a high speed while viewing the memos at the time of reproduction and editing.

Further, in a cassette library or other system automatically handling a large amount of video cassettes, the video cassette tapes are managed by using cassette labels on which barcodes are printed.

Further, in recent years, use has been made of ¼ inch digital video cassette tapes etc. in which semiconductor memory elements such as flash memories are incorporated in the cassette accommodating the video tape so as to enable recording of information such as the recording duration, recording contents, and title.

Data is recorded in and reproduced from the semiconductor memory element incorporated in the video cassette tape by for example a contact system via four electrodes, for example ground, power supply, clock, and data electrodes provided in the vicinity of the anti-erasure tab of the back surface of the cassette case.

However, as explained above, in the method of management of making memos on paper or the like, there arises a problem of cases of loss of the paper or a problem that automation is not possible.

Further, in the method of printing a barcode on the label, there is a problem in that the amount of information which can be recorded is small.

Further, in the method of using a semiconductor memory, the electrodes on the apparatus side must be made to suitably contact the electrodes, so there is a problem that the recording/reproduction of data could not be adequately carried out if the positioning thereof was not precise. Further, there also arises a problem in that poor contact occurs due to the adhesion of dust etc. and therefore the recording/reproduction of data cannot be adequately carried out. In any case, there is a limit to the number of repeat uses because of the contact system, the stability of operation is not sufficient, and there is a problem in reliability.

Further, while it may be possible to easily confirm the content of footage which is newly recorded using the video cassette tapes mentioned above, this cannot be used for the enormous amount of video tape cassettes, several hundreds of thousands in for example television broadcasting stations, which have been already recorded on.

SUMMARY OF THE INVENTION

An object of the present invention is to provide a cassette label for a video cassette tape with which additional information of the recorded video data can be recorded and which can be applied even to video cassette tapes on which video data has been already recorded.

Another object of the present invention is to provide a video cassette tape capable of adequately recording the additional information of the recorded video data.

In order to solve the problems, a semiconductor memory or other recording device is accommodated in the cassette label and the non-contact system used for the transfer of data. By adhering this cassette label, it is made possible to suitably manage data even for video cassette tapes on which video data has been already recorded.

Accordingly, a cassette label of the present invention has an integrated circuit having a memory unit and a signal processing unit; an antenna means for carrying out at least a transfer of signals with respect to the integrated circuit; and a label body accommodating the integrated circuit and the antenna means and mounted on a back surface of a video cassette tape. Note that the memory unit allows the recording, addition, correction, or erasure of any information based on signals transferred through the antenna means.

Preferably, the label body has a surface member capable of carrying any words, graphics, etc.; a reinforcing material; a substrate on which the integrated circuit and the antenna means are mounted; and an adhesive member for adhering the label body to the video cassette tape. These are adhered together in that order to form an Integral assembly.

More preferably, a protective material is filled in gaps of a space form in the label body of this configuration for mounting the integrated circuit.

Further, the video cassette tape of the present invention has a video tape for recording video signals; a cassette case for accommodating the video tape; and a cassette label mounted on the back surface of the cassette case and having an integrated circuit having a memory unit and a signal processing unit and an antenna means for carrying out the transfer of at least signals with respect to the integrated circuit.

Preferably, the label body has a surface member capable of carrying any words, graphics, etc.; a reinforcing material; a substrate on which the integrated circuit and the antenna means are mounted; and an adhesive member for adhering the label body to the video cassette tape. These are adhered together in that order to form an integral assembly.

Specifically, the memory unit has recorded in it information indicating the recording date and time, recording duration, recording place, and recording contents of the video data recorded on the video tape and information such as the recording person, recording conditions, etc.

Specifically, the memory unit has recorded in it information indicating the recording position on the video tape, recording date and time, recording duration, and recording contents of cuts recorded on the video tape, index pictures of cuts, predetermined information input by the recording person at the recording of the cuts, and other information.

More specifically, the memory unit has recorded in it information indicating the recording position on the video tape, recording date and time, recording duration, and recording contents of the data with respect to the data for a predetermined period marked by the recording person in the video data recorded on the video tape, index pictures of the data, predetermined information input by the recording person at the time of recording of the data, and other information.

BRIEF DESCRIPTION OF THE DRAWINGS

These and other objects and features of the present invention will become more apparent from the following description of the preferred embodiments given with reference to the attached drawings, wherein:

FIG. 1 is a view of the configuration of a cassette label of an embodiment of the present invention;

FIG. 2 is a view for explaining the configuration of the cassette label shown in FIG. 1;

DESCRIPTION OF THE PREFERRED EMBODIMENTS

Figure 3:
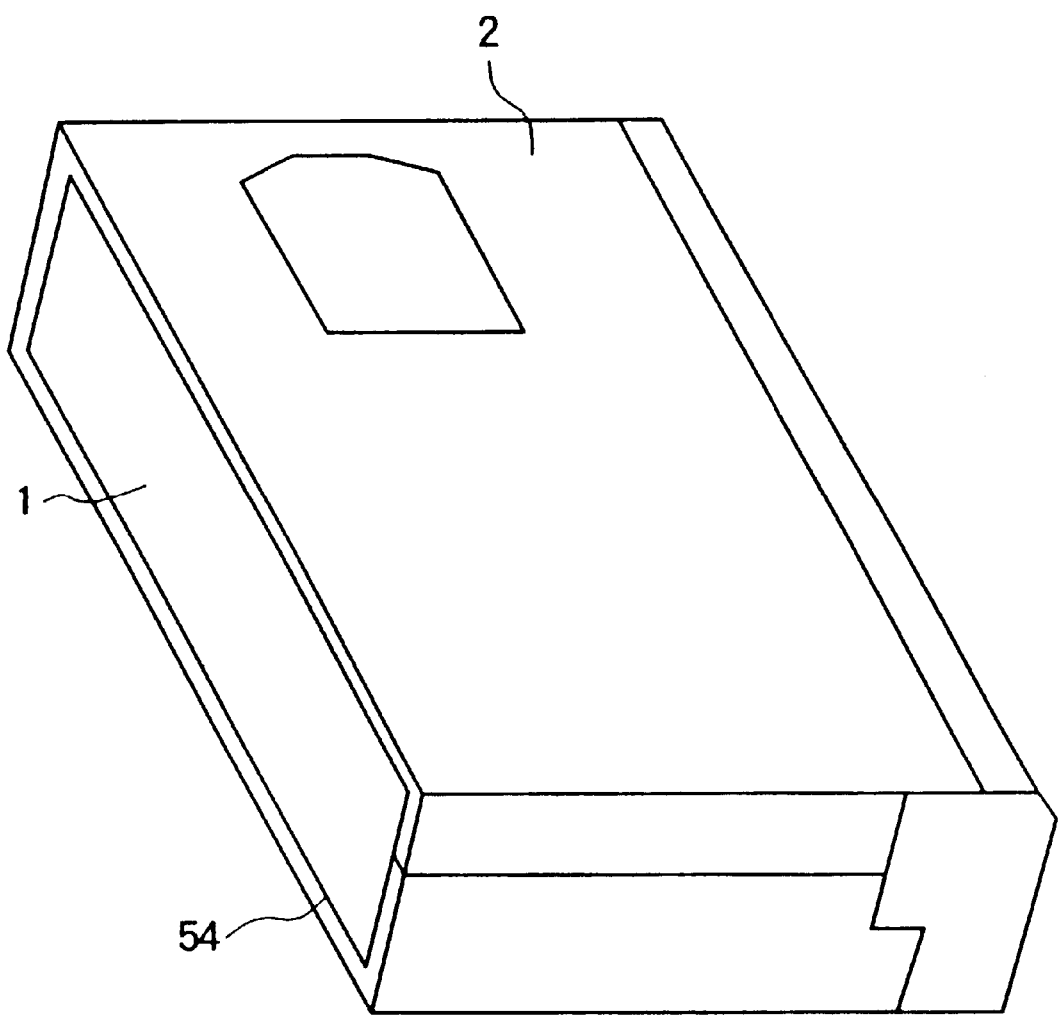
FIG. 3 is a perspective view of an outer appearance of a video cassette tape to which the cassette label according to the present invention is attached.

An explanation will be made of embodiments of the present invention by referring to FIG. 1 to FIG. 4.

FIG. 1 is a view of the configuration of a cassette label according to the present invention in the present embodiment.

A cassette label 1 is a rectangular paper-like label which is adhered to the back surface of a video cassette tape and can carry for example the title of the recorded video data thereon.

First, an explanation will be made of the configuration of the cassette label 1.

The cassette label 1 is formed with an integrated circuit ("IC") 20 and an antenna 30 embedded in the label body 10.

FIG. 2 is a view of the concrete configuration of the cassette label 1.

The label body 10 is constituted by a label proper 11 and a both faces adhesive material 17. The label proper 11 is configured, as shown in FIG. 2, by a coated paper 12, a reinforcing material 14, and a polyimide substrate 16 adhered by pressure sensitive adhesive 13 and 15 to form an integral assembly.

On the front surface of the coated paper 12, that is the surface opposite to the surface adhering with pressure sensitive adhesive 13, information such as the title, recording date, and recording place of the video data recorded on for example the video tape can be described.

The reinforcing material 14 is a member for ensuring a constant strength so that the members of the cassette label 1 or IC 20 and antenna 30 are not broken or cut even if a bending force etc. is applied to the cassette label 1. In this reinforcing material 14, an opening 41 is formed at a position overlying the IC 20 when adhered to the polyimide substrate 16, whereby the thickness of the IC 20 is absorbed. Further, by this opening 41, an IC protective material is filled in the spaces formed at the periphery of the IC 20 when the coated paper 12, the reinforcing material 14, and the polyimide substrate 16 are adhered to each other.

The polyimide substrate 16 is the substrate on the surface of which the IC 20 and the antenna 30 are mounted. In the cassette label 1 of the present embodiment, the IC 20 is mounted on one end of the polyimide substrate 16, and the antenna 30 is arranged at the center of the polyimide substrate 16.

The two-sided adhesive material 17 is a member for adhering the label body 11 to the video cassette tape. One surface is adhered to the polyimide substrate 16, while a exfoliative paper 18 is adhered to the other surface. Accordingly, when this cassette label 1 is used, the user peels off this exfoliative paper 18 to adhere the cassette label 1 to the video cassette tape.

The IC 20 is the integrated circuit having a recordable memory unit and a signal processing unit. In the cassette label 1 of the present embodiment, the IC 20 has a memory of a storage capacity of 8 Kbytes. Further, the signal processing unit provided in the IC 20 is a processor operating by a clock of 13 MHz and carries out processing such as the reading and writing data with respect to the memory and the transfer of data with an external read/write module via the antenna 30 mentioned later.

The antenna 30 is an antenna for carrying out the supply of power and transfer of signals without contact points between the cassette label 1 and the external read/write module.

Note that, in the cassette label 1 shown in FIG. 1, a length a of the longitudinal direction thereof is about 140 mm, a width b is 18 mm, a thickness c of the label proper 11 is 0.5 mm, and a thickness d of the both faces adhesive material 17 is 0.1 mm.

Next, an explanation will be made of the method of use and method of application of the cassette label 1.

A state where such a cassette label 1 is adhered to the video cassette tape 2 is shown in FIG. 3.

As shown in FIG. 3, the cassette label 1 is adhered to a depression 54, formed in accordance with the shape of the label on the back surface of the video cassette tape 2, by the both faces adhesive material while the exfoliative paper 18 is being peeled off. At this time, the cassette label 1 may be oriented in any direction. That is, the antenna 30 of the cassette label 1 is provided near the center of the cassette label 1, therefore no matter which direction the cassette label 1 is adhered in, the antenna 30 will always come near the center of the depression 54 of the video cassette tape 2, and relative position between the external read/write module and the antenna will become constant.

Then, although not illustrated, words, graphics, or anything other information may be visibly placed on the surface of the cassette label 1 by any writing tool. Note that, the information on the surface of the cassette label 1 may be printed in advance or printed after mounting on the video cassette tape 2. Namely, the cassette label 1 is used in almost the same way as a conventional cassette label not having the IC 20 and the antenna 30.

Figure 4:
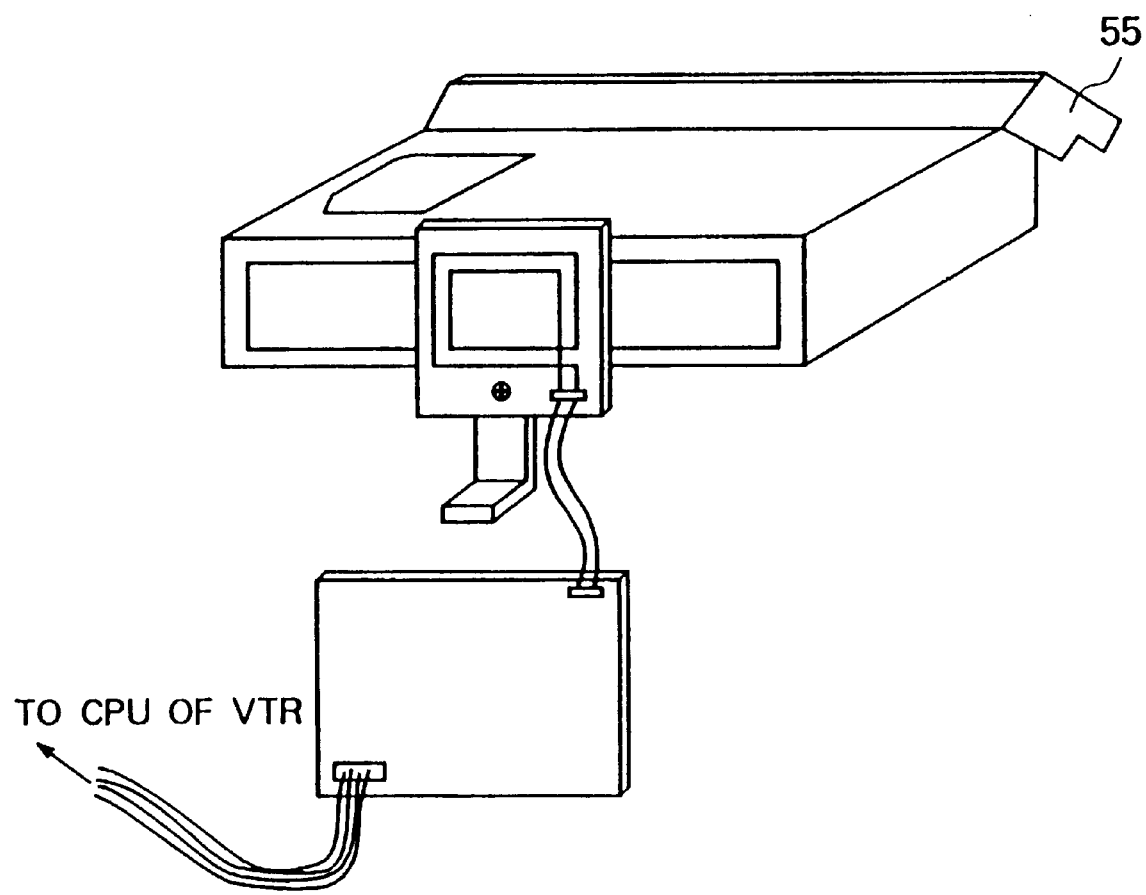
FIG. 4 is a view for explaining a state where the video cassette tape to which the cassette label shown in FIG. 3 is attached is mounted in a video data recording and reproduction device and the transfer of data is carried out with respect to the IC in the cassette label.

The method of use of the video cassette tape 2 to which the cassette label shown in FIG. 3 is attached is shown in FIG. 4.

FIG. 4 is a view of the state where the video cassette tape 2 to which this cassette label is attached is mounted in the video tape recorder (VTR) apparatus, and data is transferred to the IC 20 in the cassette label 1.

As shown in FIG. 4, when the video cassette tape 2 to which the cassette label is attached is mounted in the VTR apparatus, a lid 55 of the surface portion is opened and the not illustrated video tape accommodated in the video cassette tape 2 is drawn out and brought to abut against the heads of the video data recording and reproduction device.

On the other hand, an antenna 90 projected from a label read/write module 91 provided in the VTR apparatus body is arranged near the center the back surface of the video cassette tape 2. The read/write module 91 supplies power to the IC 20 of the cassette label 1 and carries out control of the same via the antenna 90. Namely, the signal processing unit in the IC 20 reads the data from the memory and transfers it to the read/write module 91 via the antenna 30 and antenna 90. Alternatively, it transfers the data from the read/write module 91 to the IC 20 via antenna 90 and antenna 30, and the signal processing unit in the IC 20 carries out the operation of recording the data in the memory.

Note that, the read/write module 91 is further connected to a signal processing unit (CPU) on the VTR apparatus side and is controlled from the VTR apparatus side.

Note that, by such an operation, the IC 20 has recorded in it data such as recording position of each cut of the video data recorded on the video tape, the recording date and time, recording place, and recording duration, the information such as the title indicating the recording contents thereof, index picture obtained from the cuts, the information input by the recording person at the time of recording, for example, good shot marks. Further, it has recorded in it information indicating the recording date and time, recording duration, recording place, recording condition, and recording contents of the entire video data recorded on the video tape and information such as the recording person, editor, number of times of editing, number of times of usage of tape, and take numbers of shot.

In this way, the cassette label 1 of the present embodiment can record the information with respect to recording condition and recording contents conventionally written on other paper or surface of a cassette label as memo. Further, since the form of the cassette label is same as the conventional cassette label, it can be used by mounting on a back surface of a video cassette tape in the same way as the conventional method.

Further, since the cassette label 1 has the IC 20 at the end of the cassette label 1, there is little chance that it will be directly pressed by the tip of a pen etc. so destruction and deformation of the IC 20 by the concentration of pressure can be prevented.

Further, if a variety of information about recorded video data is recorded in IC 20 of cassette label 1 and the cassette label 1 is attached to a video cassette tape 2 on which video data has been already recorded, a video cassette tape 3 having an auxiliary information storing means can be immediately constituted. Namely, this cassette label 1 can be used for already existing video data. Further, if the memory fails etc., the situation can be dealt with by just change the cassette label 1.

Further, since the transfer of the data with respect to this IC 20 is carried out by the non-contact system using communication between the antenna 30 and the read/write module 91, problems of poor positioning of contact points and poor contact due to a dust or wear are eliminated and suitable recording of additional information becomes possible.

Further, since the antenna 30 is located near the center of the cassette label 1, no matter what direction the cassette label 1 is adhered in on the video cassette tape 2, the antenna 30 will always come near the center of the depression 54 of the video cassette tape 2. Also, the position of the external antenna can be specified. Namely, the cassette label 1 can be adhered to the video cassette tape 2 in any direction.

Note that the present invention is not limited to the present embodiment, and various modifications are possible.

For example, the cassette label of the present embodiment was configured with the both faces adhesive material 17 at the lower surface opposite to the front surface on which words, graphics, etc. were carried and was adhered to the video cassette tape by this. However, it is also possible for example to make the back of the cassette case a pocket shape and insert the cassette label into this. In such a case, the both faces adhesive material 17 at the lower surface of the cassette label becomes unnecessary. The cassette label 1 of the present invention can take such a configuration too.

Further, the cassette label of the present embodiment was formed as a flexible paper shape similar to a conventional cassette label. However, it is also possible to use a tag-like label by imparting enough of a hardness so that bending is substantially impossible by using a harder substrate or reinforcing material.

Further, in the present embodiment, the antenna 30 was provided near the center of the longitudinal direction of the cassette label. However, the position of the antenna 30 is not limited to this. It can be provided at any position on the cassette label. Particularly, when it is possible to standardize the orientation of adhesion of cassette labels, it is not necessary to consider making the positions of the antenna the same no matter in which direction the cassette label is adhered and the antenna 30 can be provided at any position.

Further, also the IC may be positioned anywhere. If it is provided at the end portion of the cassette label as in the present embodiment, even if the cassette label is bent in the longitudinal direction, concentration of the bending force thereof can be avoided, therefore there is an advantage that the reliability can be secured. However, when the body is formed into a tag shape having a sufficient hardness, the cassette label basically cannot be bent, therefore excessive stress will not be applied no matter what position the IC is placed at. Accordingly, in such a case, the IC can be placed at any position.

Further, the cassette label of IC may be positioned anywhere in the width direction.

Further, also the circuit mounted on the cassette label can be any circuit. In the present embodiment, an explanation was made as if there was one IC, but also a circuit including peripheral circuits and a circuit constituted by two IC's can be adopted. The invention is not limited to one IC.

Other than this, the shape of the antenna, the material of the members such as the coated paper, reinforcing material, and substrate forming the label body, the adhesive agent used when bonding them, the type of the video cassette tape, the size thereof, the shape of the external antenna shown in FIG. 4, the structure of the external read/write module, the type of information to be recorded in IC, etc. are not limited by the present embodiment and can be modified in any way.

As explained above, according to the present invention, a cassette label with which additional information of the recorded video data can be certainly recorded and can be used for video cassette tape on which the video data has been already recorded, which has a high reliability and durability and can be easily handled can be provided. Further, by only mounting the cassette label on a back surface of a video cassette tape, a video cassette tape recording additional information with respect to recorded video data and which has a high reliability can be provided.

What is claimed is:

1. A cassette label for a video tape cassette insertable into an external read/write module, comprising:

an integrated circuit comprising a memory unit and a signal processing unit;

an antenna means for carrying out at least a transfer of signals with respect to said integrated circuit; and a label body having mounted therein said integrated circuit and said antenna means on a single substrate surface thereof with the label body being mounted on a back surface of the video cassette tape wherein said antenna means and said integrated circuit being completely embedded in said label body so that antenna means does not cover said integrated circuit and said antenna means carries out the supply of power and transfer of signals without contact points between the cassette label and the external read/write module.

2. A cassette label as set forth in claim 1, wherein said label body comprises a label substrate on which said integrated circuit and said antenna means are mounted and a surface member on which words or graphics can be displayed and said label substrate and said surface member are adhered to form an integral assembly.

3. A cassette label as set forth in claim 2, wherein said label body further comprises an adhesive member for adhering said label body to the video cassette tape and said surface member and the adhesive member are adhered to each other via said label substrate to form an integral assembly.

4. A cassette label as set forth in claim 2, wherein a protective material is filled in gaps of a space in said label body formed for mounting said integrated circuit.

5. A cassette label as set forth in claim 2, wherein said label body further comprises a reinforcing member and said label substrate and said surface member are adhered via the reinforcing material to form an integral assembly.

6. A cassette label as set forth in claim 1, wherein said antenna means is located in approximately center of said label body with respect to longer direction of said label body.

7. A video cassette tape insertable into an external read/write module, comprising:

a video tape for recording video signals;

a cassette case for accommodating said video tape; and a cassette label mounted on the back surface of said cassette case and comprising an integrated circuit comprising a memory unit and a signal processing unit and an antenna means for carrying out the transfer of at least signals with respect to said integrated circuit; and a cassette label comprised of a label body formed of a substrate on which said integrated circuit and said antenna means are both mounted wherein said antenna means and said integrated circuit are completely embedded in said label body so that the antenna means does not cover said integrated circuit and said antenna means carries out the supply of power and transfer of signals without contact points between the cassette label and the external read/write module.

8. A video cassette tape as set forth in claim 7, wherein said cassette label comprises a surface member displaying words or graphics and adhered to each other to form an integral assembly.

9. A video cassette tape as set forth in claim 8, wherein said memory unit of said cassette label allows the recording, addition, correction, and erasing of any information based on signals transferred via said antenna means.

10. A video cassette tape as set forth in claim 9, wherein said memory unit of said cassette label has recorded information indicating the recording date and time, recording duration, recording place, and recording contents of the video data recorded on said video tape and information such as the recording person, recording conditions, number of times of usage of said video tape, and number of times of editing.

11. A video cassette tape as set forth in claim 9, wherein said memory unit of said cassette label has recorded information such as the information indicating the recording position on said video tape, recording date and time, recording duration, and recording contents of cuts recorded on said video tape, index pictures of cuts, take numbers of the cuts, and predetermined information recorded on the cuts.

12. A video cassette tape as set forth in claim 9, wherein:

said memory unit of said cassette label has recorded information indicating the recording position on said video tape, recording date and time, recording duration, and recording contents of the data with respect to the data for a predetermined period marked in the video data recorded on said video tape, index pictures of said data, take numbers of said data, and the predetermined information inputted at the time of recording of the data.

* * * * *